Patented June 19, 1928.

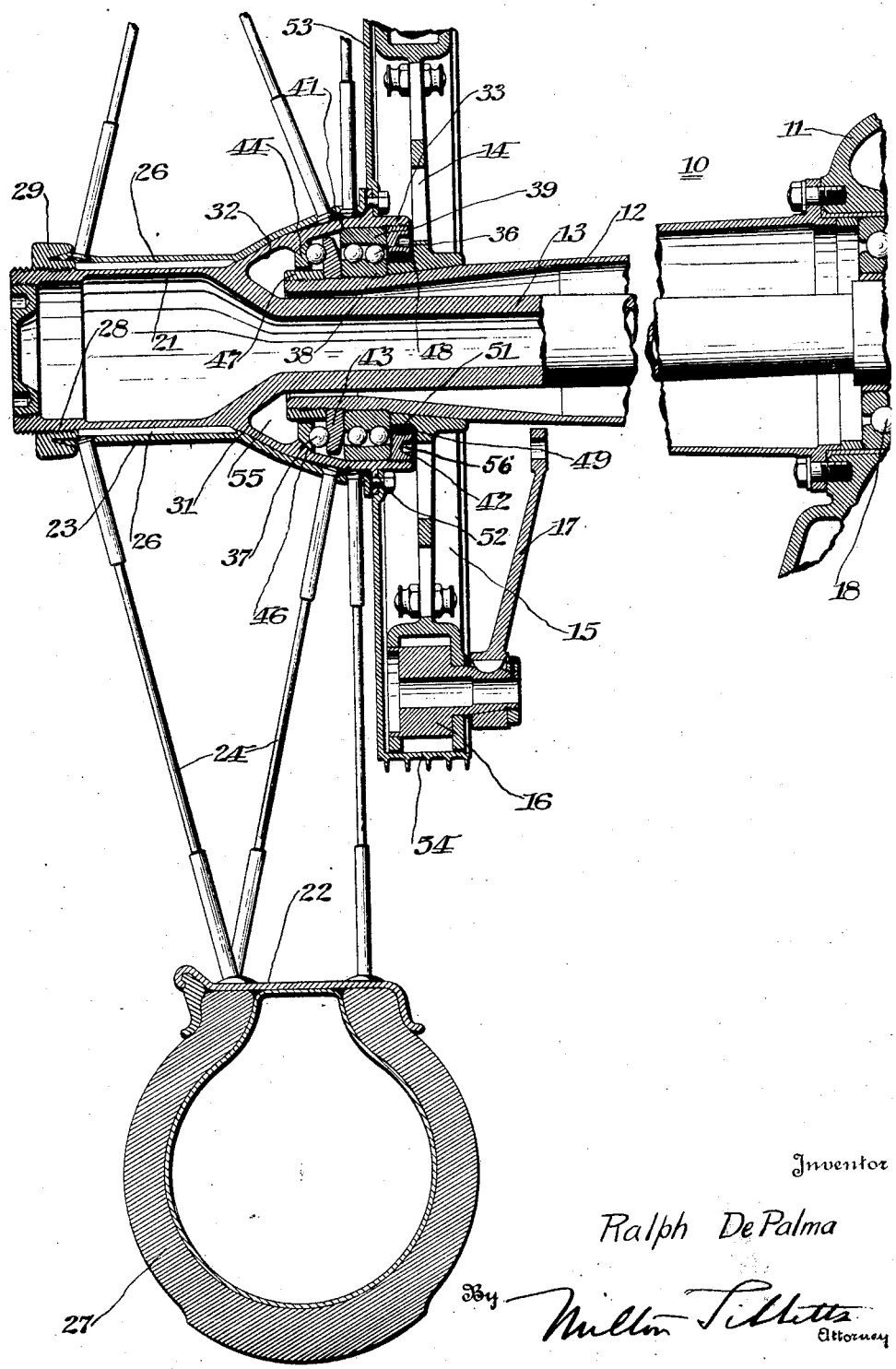

1,673,809

UNITED STATES PATENT OFFICE.

RALPH DE PALMA, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 13, 1923. Serial No. 668,288.

This invention relates to motor vehicles, particularly to the driving axles thereof, and it has for an object to provide such an axle which shall be light and strong, and in which an adequate supply of lubricant to the outer wheel bearings shall be insured.

Other objects and structural details of the invention will appear from the following description taken in connection with the drawing, which forms a part of this specification, and in which the single figure is a vertical section through part of the rear axle of a motor vehicle, showing the application of the invention thereto.

Referring to the drawing, the rear or driving axle of a motor vehicle is shown at 10. It will be understood that the axle construction and wheel mounting for both ends of the axle are exactly alike and for this reason one end only of the axle has been illustrated. The axle 10 includes a housing 11, containing the usual differential and drive gearing (not shown) and adapted to contain suitable lubricant, preferably heavy oil. Projecting from the housing 11 on each side thereof, and bolted or otherwise suitably secured thereto, is a tubular housing 12 tapered toward its outer end, and adapted to enclose and support the drive shaft 13. The housing 12 is provided near its outer extremity with a radially disposed plate 14, to which suitable brake shoes 15 are pivoted. The brake shoes 15 are expanded by a cam 16, mounted on the plate 14, by means of a lever 17, in a manner well understood in the art to which this invention relates. The plate 14 is secured to the housing 12 by a base having a tapered engagement with the housing.

Each of the drive shafts 13 is journaled near its inner end in an appropriate bearing 18, suitably mounted in the housing 11. At its outer end the shaft 13 is formed with an outwardly flared portion 13′ terminating in an outwardly directed expanded end 21, constituting a hub for the vehicle wheel. In the embodiment illustrated, a conventional wire wheel having a rim 22, a hub shell 23, and wire spokes 24, is mounted on the hub 21, and is secured thereto for rotation as by means of keys 26. It is to be understood, however, that any suitable wheel may be employed in connection with the axle disclosed in this invention. The rim 22 is provided with the usual tire 27. The outer end of the hub 21 is threaded, as shown at 28, for cooperation with a hub cap 29, by means of which the wheel is held on the hub 21.

Integral with the hub 21 is inwardly directed expanded circumferential flange 31, having a tapering portion 32 and an axially disposed portion 33, spaced from and overhanging the end of the housing 12. Between the flange 31 and the housing 12 is placed suitable bearing means for the support of the outer end of the shaft 13. As shown, the bearing means comprises a radial bearing 36 and a thrust bearing 37, but it is to be understood that bearings of any of the well known types may be used at this point.

The radial bearing 36 has the usual inner race ring 38 and outer race ring 39, mounted respectively on the housing 12 and on the flange 31. The inner ring 38 is positioned against the base of the brake supporting plate 14 on one side, and against an element of the thrust bearing 37 on the other side. The outer ring 39 bears against a shoulder 41, formed at the juncture of the portions 32 and 33 of the flange 31, and is positioned thereagainst by a ring nut 42, threaded into the end of the flange portion 33.

The thrust bearing 37 is provided with an inner thrust ring 43, which is seated on the housing 12 and bears against the race ring 38, and with an outer thrust ring 44 which seats against a circumferential face 46 on the flange portion 32. The inner thrust ring 43 is also engaged by a ring nut 47, threaded to the outer extremity of the housing 12.

By means of the bearing 36, the shaft 13 is accurately positioned with respect to the housing 12, and the thrust of the vehicle wheel is directly transmitted to the housing 12 through the bearing 37. The ring nut 42 is provided on its inner surface with a groove 48, in which is disposed a gasket or washer 49 of felt or other suitable material. This washer 49 contacts a face 51 on the brake plate 14, and makes a running seal therewith to prevent the escape of lubricant in a manner well known in the art.

The flange 31 is also provided with a radially disposed flange 52, to which is secured a suitable brake drum 53, of usual construction, preferably provided with a ribbed flange 54. This brake drum flange 54 is adapted for cooperation with the brake shoes 15 pivoted to the brake plate 14 above described.

The flange 31 of the shaft 13 defines with the hub portion 21 thereof a pocket 55, which is adapted to trap and hold lubricant for the bearings 36 and 37.

The operation of this device will be apparent. Lubricant is thrown into the housing 12 from the housing 11 by the action of the gears therein and works through the housing 12 into the pocket 55. This flow of lubricant is facilitated when the wheel is below the horizontal level, as for example when the vehicle is running on a crowned road. When the wheel is above the horizontal level the reverse flow occurs, the lubricant tending to drain back toward the housing 11. A portion of the lubricant is, however, trapped by the pocket 55 and retained therein. This pocket 55 therefore acts as a local reservoir, retaining a small quantity of lubricant in proximity to the bearings 36 and 37. This lubricant is splashed from the pocket 55 on the bearings 36 and 37, thus insuring a supply of lubricant thereto. Leakage from the wheel hub is prevented, however, by the felt washer 39.

This assembly of the hub structure and removal of the shaft 13 is accomplished in the following manner. The axle housing 12 is raised, as by means of a jack, and the ring nut 42 is held against rotation in any convenient way, as by means of a spanner wrench inserted in the axially disposed recesses 56 therein through suitable openings in the brake plate 14. The wheel is then rotated in the proper direction to unscrew the threaded end of the flange 33 from the ring nut 42, after which the shaft 13, with the wheel, brake drum, and attached parts, can be withdrawn axially from the housing 12, exposing the bearings 36 and 37. In assembling the parts, the reverse procedure is followed.

It will be understood that various forms of the invention other than those described above may be used without departing from the spirit or scope of the invention.

What is claimed is:

1. The combination in a motor vehicle, of a driving axle comprising a housing, a tubular drive shaft therein having an expanded end forming a hollow wheel receiving hub extending outwardly beyond the end of the housing, a flange on the expanded end extended inwardly so as to surround and overhang the end of the housing, and a bearing between the flange and the housing.

2. The combination in a motor vehicle, of a driving axle comprising a housing, a tubular drive shaft therein having an outwardly directed expanded end forming a hollow hub, to which a wheel of said vehicle is secured, an inwardly directed expanded flange on the hub disposed so as to surround and overhang the outer end of the housing, and a bearing between the housing and the inwardly directed expanded flange.

3. The combination in a motor vehicle, of an axle housing, a tubular axle therein having an outwardly directed expanded end forming a hollow wheel receiving hub, an expanded flange directed inwardly from the hub around the end of the housing and forming with the hub a pocket adapted to receive lubricant from the housing, and a bearing between the housing and the inwardly directed expanded flange.

4. The combination in a motor vehicle of a driving axle comprising a housing, a tubular drive shaft in said housing flared outwardly from one end thereof and terminating beyond the same in an enlarged wheel receiving hub portion, a flange formed integrally with said hub portion and extending inwardly therefrom so as to surround and overhang said end of the housing, and bearings between said flange and the housing.

5. The combination in a motor vehicle of a driving axle comprising a tubular housing, a hollow drive shaft therein having an outwardly flared part terminating in an enlarged wheel receiving hub portion disposed beyond the end of the housing, a flange on the hub portion directed inwardly therefrom around the end of the housing and forming a pocket with the outwardly flared part of said hollow drive shaft, and a bearing between said flange and the tubular housing adapted to receive lubricant from said pocket.

6. The combination in a motor vehicle of a driving axle comprising a tubular housing, a hollow drive shaft therein having an outwardly flared part terminating in an enlarged wheel receiving hub portion disposed beyond one end of said housing, a flange on said hub portion extending inwardly therefrom around the housing and forming a pocket with the outwardly flared part of said hollow drive shaft, a bearing between the flange and the housing, and means at the opposite end of the housing adapted to contain lubricant delivered through the housing to said pocket to lubricate said bearing.

7. In a motor vehicle, an axle comprising a tubular drive shaft provided adjacent one end with an outwardly flared part terminating in an enlarged wheel receiving hub portion, a flange extending inwardly from said hub portion and forming a pocket with the outwardly flared part of said drive shaft, a tubular drive shaft housing having one end projecting into said pocket, a bearing in the pocket coacting with the housing and said flange, and means communicating with the housing adapted to contain lubricant delivered therethrough to the pocket and said bearing.

8. In a motor vehicle, an axle comprising a tubular drive shaft provided adjacent one end with an outwardly flared part terminating in an enlarged wheel receiving hub portion, a flange extending inwardly from the hub portion defining a pocket with said outwardly flared part and supporting a brake drum, a tubular housing surrounding the drive shaft and projecting into said pocket, and a bearing between said flange and the tubular housing.

9. In a motor vehicle, an axle comprising a tubular drive shaft having outwardly and inwardly directed flared portions defining a pocket and terminating in enlarged wheel receiving means, a housing for the drive shaft adapted to contain lubricant and projecting into the pocket, and a bearing arranged between the inwardly directed flared part of the drive shaft and said housing and receiving lubricant supplied from the latter to said pocket.

10. In a motor vehicle, an axle comprising a pair of alined tubular drive shafts each provided with outwardly and inwardly directed flared portions defining pockets and terminating in enlarged wheel receiving means, a housing for said shafts projecting into and communicating with the pockets and adapted to contain lubricant, and bearings arranged between the housing and the inwardly directed flared portions of the drive shafts, said bearings being adapted to receive lubricant delivered into said pockets from said housing.

11. In a motor vehicle, an axle comprising a drive shaft formed with an outwardly extending flared part terminating in an enlarged wheel receiving hub portion, a second flared portion terminating in an axially disposed flange and extending inwardly from said hub portion to provide a pocket with said outwardly extending flared part of the drive shaft, a housing for said shaft projecting into said pocket, and a bearing arranged between the housing and said flange.

12. In a motor vehicle, an axle comprising a pair of alined drive shafts formed with outwardly extending flared parts terminating in enlarged wheel receiving hub portions, inwardly extending flared parts formed on said hub portions, terminating in flanges and providing pockets with the outwardly extending flared parts of the drive shafts, a shaft housing communicating with the pockets and having its opposite ends projecting between the shafts proper and the inwardly extending flanges thereof, and bearings arranged between the housing and said flanges and adapted to receive lubricant delivered to said pockets from the shaft housing.

In testimony whereof I affix my signature.

RALPH DE PALMA.